Aug. 3, 1937.      H. DYCKERHOFF      2,089,116
PROCESS FOR TREATING COFFEE
Filed April 7, 1933
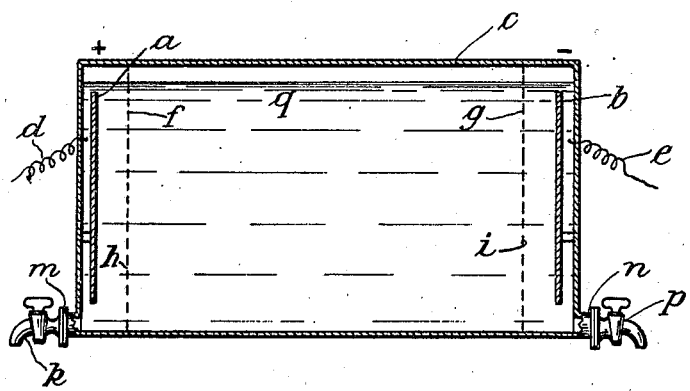
Inventor:
Hanns Dyckerhoff Patented Aug. 3, 1937

2,089,116

UNITED STATES PATENT OFFICE 2,089,116

PROCESS FOR TREATING COFFEE

Hanns Dyckerhoff, Munich, Germany

Application April 7, 1933, Serial No. 665,014
In Germany June 10, 1931

11 Claims. (Cl. 99—69)

As is well known, the drinking of coffee has various physiologically and dietetically injurious consequences which are attributes to the caffeine contents of the coffee infusions and therefore attempts have been made to eliminate them by extracting the caffeine from the coffee beans.

It has been further found that the chlorogenic acid contained in the coffee beans in the form of chlorogenate potassium caffeine affected the taste of the coffee, and it was therefore cracked by hydrolysis, two constituents being produced: caffeic acid and quininic acid which however were left in the coffee bean (Swiss Patent 139,789), so that the coffee was not freed of this poison.

It was however soon discovered that chlorogenic acid has also an injurious effect as it unfavourably affected mainly the enzymatic digestion processes in both physiological and dietetic respects. It has been further found that the caffeic acid constituent is the carrier of the poisonous action that is to say that the chlorogenic acid must not only be cracked but that the caffeic acid must be removed, whilst the non-poisonous quininic acid may be left in the beans.

This invention relates therefore to a process by means of which the chlorogenic acid is cracked into caffeic acid and quininic acid either by means of the ferment tannase or by the action of ozone, whereupon the caffeic acid or the products of cracking by ozonization are removed by means of suitable organic solvents such as for example acetone or alcohol, the taste of the coffee being unaffected thereby. The chlorogenic acid can also be cracked by electrolysis, and the products produced at the electrodes separated there.

It is well known that chlorogenic acid is decomposed by the action of the tannase ferment, into caffeic acid and quininc acid, but this process has not been previously used for the elimination of the chlorogenic acid from the coffee bean. The caffeic acid is extracted from the bean by means of organic solvents such as for example ether or acetone.

Chlorogenic acid may be however cracked also by ozone. It contains namely a double bond (—CH=CH—), and it is known that ozone acts on such organic compounds in such a manner that it settles on the double bond. The ozonides thus formed are however exceedingly unstable and decompose at the place of the double bond.

The action of ozone on chlorogenic acid or on the product of its cracking by hydrolysis—the caffeic acid—produces proto-catechualdehyde which is converted by the continued action of ozone into lower products of decomposition which are partly easily soluble in organic solvents, and partly highly volatile so that they may be removed on the one hand by extraction for instance with acetone, and on the other hand owing to their volatility also during the roasting of the coffee.

There is also the further possibility of cracking chlorogenic acid by ozonization in such a manner that during the roasting ozonized air is passed through the material treated. The products of cracking escape then owing to their volatility.

In cracking by electrolysis, the steamed, that is to say the opened up, raw and then thoroughly moistened coffee beans are covered with a layer of water, and electric current is thereupon passed. The chlorogenic acid and its products of cracking separate at the anode, the potassium caffeine and its products of conversion and of decomposition on the cathode, where they can be directly discharged by using a suitable apparatus.

The raw coffee beans may also be first extracted and the extract electrolyzed in the same way, and the products of cracking eliminated. The extract thus freed from injurious ingredients may be used as a coffee extract free from chlorogenic acid, or concentrated or also converted in the well known manner to an extract powder.

Chlorogenic acid may be eliminated in the same way also from the extracts or infusions of roasted coffee and made in the same way as before into a liquid coffee extract or an extract powder free from chlorogenic acid.

As caffeine is also soluble in most organic solvents, it may be withdrawn from the beans simultaneously with the products of cracking of the chlorogenic acid.

The process itself may be more particularly explained by the following examples:

*Example 1.*—After opening up the beans by treatment with superheated steam, tannase solution is caused to act on the beans, due to which the chlorogenic acid present is cracked into quininic acid and caffeic acid. An extraction is then carried out with an organic solvent (for example acetone) due to which the products of cracking of the chlorogenic acid, including the caffeic acid, are removed. The easily volatile solvent may be completely removed if necessary in the well known manner by an additional treatment with steam.

*Example 2.*—Coffee beans are opened up in a well known manner by means of superheated steam. The beans are then treated in an airtight apparatus at a varying pressure at temperatures between 20° and 120° C. with air containing ozone. The beans treated in this manner are extracted in extraction apparatus with organic solvents, for example ether and acetone, due to which the injurious products of cracking are removed from the bean. Any traces of volatile products of cracking escape during the roasting of the bean.

*Example 3.*—For carrying out the process in this example a special electrolyzing device shown in the accompanying drawing is employed. In the tank $c$ are arranged at either end the anode $a$ and the cathode $b$ to which are connected the current leads $d$ and $e$. The tank $c$ is divided by the diaphragms $f$ and $g$ into three parts, namely the anode compartment $h$, compartment $q$ intended to receive the coffee beans or the coffee extract, and the cathode compartment $i$. The discharge pipes $m$ and $n$ are closed by the cocks $k$ and $p$. The coffee beans opened up by means of superheated steam are introduced into the central compartment $q$ and covered with a layer of water. Direct current is then passed. Electrolysis begins at once and when it is completed, the chlorogenic acid formed and collected in the anode compartment $h$ and its products of decomposition are discharged through the pipe $k$, whilst from the cathode compartment $i$ potassium caffeine and its products of conversion and decomposition are discharged through the pipe $n$.

What I claim is:—

1. A process for treating raw coffee beans to eliminate the injurious ingredients such as chlorogenic acid, consisting in opening the beans, cracking the chlorogenic acid contained in the opened beans in a non-aqueous medium, and extracting the products of cracking from the beans by means of organic solvents.

2. In a process as set forth in claim 1, the chlorogenic acid being cracked by treatment with tannase.

3. In a process as set forth in claim 1, the chlorogenic acid being cracked by treatment with air containing ozone.

4. In a process as set forth in claim 1, treating the raw coffee beans with air containing ozone, and removing the products of cracking of the chlorogenic acid with heated air containing ozone.

5. A process for treating raw coffee beans to eliminate the injurious ingredients such as chlorogenic acid, consisting in steaming the beans to open same; subjecting the opened beans to treatment with tannase to crack the chlorogenic acid into quininic acid and caffeic acid, extracting the quininic and caffeic acids with organic solvents; and removing the solvents.

6. A process for treating raw coffee beans to eliminate the injurious ingredients such as chlorogenic acid, consisting in steaming the beans to open same; subjecting the opened beans to treatment with air containing ozone to crack the chlorogenic acid into quininic acid and caffeic acid, extracting the quininic and caffeic acids with organic solvents, and removing the solvents.

7. In a process as set forth in claim 6, heating the air containing ozone to drive off the products of cracking of the chlorogenic acid.

8. A process for treating raw coffee beans to eliminate the injurious ingredients such as chlorogenic acid, consisting in opening the beans, cracking the chlorogenic acid contained in the opened beans in a non-aqueous medium and extracting the products of cracking from the beans by means of organic solvents which only extract the constituents of the chlorogenic acid.

9. In a process as set forth in claim 8, the chlorogenic acid being cracked by treatment with tannase.

10. In a process as set forth in claim 8, the chlorogenic acid being cracked by treatment with air containing ozone.

11. In a process as set forth in claim 8, treating the raw coffee beans with air containing ozone, and removing the products of cracking of the chlorogenic acid with heated air containing ozone.

HANNS DYCKERHOFF.